June 21, 1927.

W. BAUMGARTNER

VALVE

Filed May 22, 1926

1,633,061

Inventor
Werner Baumgartner

By *Clarence A. O'Brien*

Attorney

Patented June 21, 1927.

1,633,061

UNITED STATES PATENT OFFICE.

WERNER BAUMGARTNER, OF ELGIN, ILLINOIS.

VALVE.

Application filed May 22, 1926. Serial No. 111,003.

My present invention pertains to valves; and it contemplates the provision of a valve composed of but a few parts and so characterized that packing is not necessary to guard against leaking, and also so characterized that it is susceptible of easy manipulation and is adapted to last for an indefinite period of time with no repairs or other attention.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
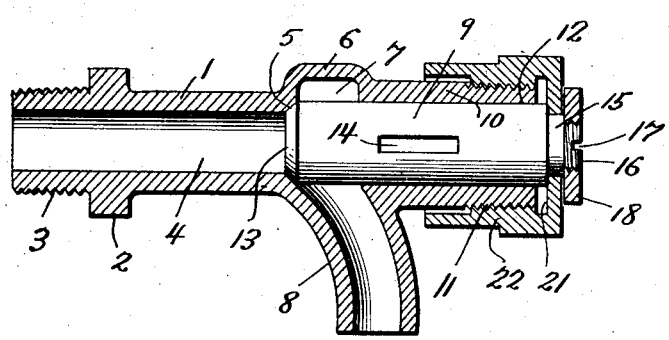
Figure 1 is a view partly in longitudinal section and partly in elevation of the valve constituting the preferred embodiment of my invention.
Figure 2:
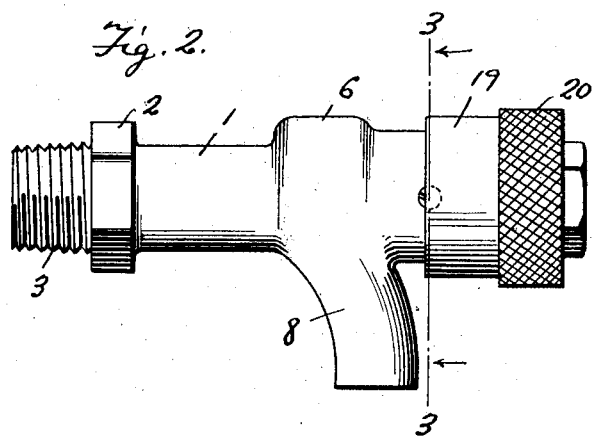
Figure 2 is a full side elevation of the valve.
Figure 3:
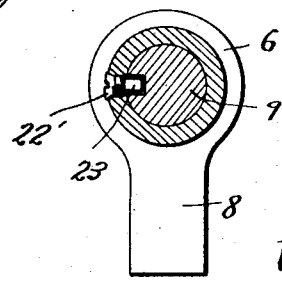
Figure 3 is a transverse section taken in the plane indicated by the line 3—3 of Figure 2, looking toward the left.

Among other elements my novel valve comprises a casing body 1, preferably equipped adjacent to its heel end with an enlargement 2 and with a threaded end portion 3. The said casing body 1 is provided with a bore 4 at the forward end of which is a seat 5, and immediately in front of the said seat 5 the casing body 1 is provided with a lateral swell 6 in which is a chamber 7 in communication with a lateral spout 8, which spout 8 is designed when the valve body 9 is in open position to discharge water or other liquid from the bore 4 and the chamber 7.

In front of the chamber 7 and spout 8, the casing body 1 is provided with a cylinder portion 10, exteriorly threaded at 11 and having a bore 12 for the reception and rectilinear movement of the valve body 9. The said valve body 9 is bevelled at its inner end as designated by 13 to correspond to the seat 5, and is provided at its end with a longitudinal slot 14 and it is also provided adjacent to its outer side with a reduced circular portion 15 beyond which it has a threaded end portion 16 in which there is a kerf 17. The threaded portion 16 is for the reception or engagement of a nut 18, the said nut being preferably of angular configuration and being adapted to be held against turning while the valve body 9 is turned into engagement with the nut through the medium of a screw driver or other appropriate implement engaged with the kerf 17.

At 19 is what I designate the combined nut and hand wheel of my novel valve, the said combination device being provided with a knurled circumferential portion 20 and being also provided with an apertured end wall 21 and an interiorly threaded portion 22. The said end wall 21 is swivelled on the reduced circular portion 15 of the valve body 9, and the said interiorly threaded portion receives the threaded portion of the casing body 1, after the manner shown in Figure 1.

A screw 22' is threaded into the side of the cylindrical portion 10 of the casing body 1 and is provided with a reduced inner portion 23, disposed in the groove or slot 14 of the valve body 9. By virtue of the co-operation of the slot 14 and screw 22', the valve body 9 is held against any movement save rectilinear movement, and outward or opening movement of the valve body 9 is limited with the result that there is no liability of the valve body 9 and its appurtenances being casually detached from the casing body 1.

It will be appreciated from the foregoing that the element 19 of my improvement is disposed at the forward end of the valve where it is convenient of access and is adapted to afford means for the easy and quick manipulation of the valve. It will also be appreciated that rotation of the element 19 in one direction will be attended by rectilinear outward movement of the valve body 9, while rotation of the element 19 in the opposite direction will bring about inward rectilinear movement and tight closing of the valve body 9 against the seat 5, and this in such manner that leakage is precluded notwithstanding no packing is employed.

It will further be appreciated from the foregoing that my novel valve is extremely simple and inexpensive in construction and is entirely free of delicate parts such as are likely to be worn out after a short period of use.

The novel valve is further advantageous because of the simplicity and compactness of its structure, and also because of its adaptability to be embellished so as to enhance rather than detract from any apparatus with which it may be associated.

I have explicitly described the preferred embodiment of my invention in order to impart an understanding of said embodiment in all of its details. I do not desire, however, to be understood as limiting myself to the precise construction disclosed, my invention being defined by my appended claim within the scope of which modifications may be made without departure from my invention.

Having described my invention, what I claim and desire to secure by Letters-Patent, is:—

In a valve and in combination, a casing body having a bore and a valve seat at the forward end of the bore and also having a lateral chambered swell immediately in front of said valve seat and a lateral spout also in front of the valve seat, the portion of the casing body in front of the swell and the chamber therein and the spout, being provided with a circular bore of even diameter throughout its length and being open at its forward end and being also provided with an exterior thread, a rectilinearly movable valve body circular in cross section and of even diameter throughout its length disposed in the bore in the forward portion of the casing body and having its inner end beveled and opposed to said valve seat and also having a longitudinal slot in its side and further having a circular reduced portion adjacent to its forward end and a further reduced and threaded forward end, an inwardly projecting portion carried by the casing body and disposed in the slot of the valve body, a combined nut and hand wheel interiorly threaded and engaging the forward exterior thread of the casing body and having an end wall in which is a central circular aperture snugly receiving the circular reduced portion of the valve body, and further having a knurled circumferential portion, and a nut mounted on the threaded end portion of the valve body and opposed to the said end wall of the combined nut and hand wheel.

In testimony whereof I affix my signature.

WERNER BAUMGARTNER.